TAPE CONTROL APPARATUS

Filed March 14, 1961 2 Sheets-Sheet 1

INVENTOR.
ROBERT W. CHAMBERS
BY Morris A. Rabkin
ATTORNEY

Jan. 25, 1966 R. W. CHAMBERS 3,231,163

TAPE CONTROL APPARATUS

Filed March 14, 1961 2 Sheets-Sheet 2

INVENTOR.
ROBERT W. CHAMBERS
BY

ATTORNEY

United States Patent Office 3,231,163

Patented Jan. 25, 1966

3,231,163

TAPE CONTROL APPARATUS

Robert W. Chambers, Levittown, Pa., assignor to Radio Corporation of America, a corporation of Delaware Filed Mar. 14, 1961, Ser. No. 95,692
11 Claims. (Cl. 226—95)

The present invention relates to apparatus for controlling the movement of a tape medium, and more particularly to pneumatic tape drive devices.

The invention is especially suitable for use in computer tape stations as a part of the tape transport mechanism thereof. The invention is also generally useful in apparatus for controlling the movement of various other media. The term "tape," as used herein, is intended to designate any web member, strip, film or portion thereof, or any object which is adapted to be fed or controlled in its movement in accordance with the features of this invention, as well as tape itself.

It is often desirable to accelerate a tape from rest to high speed in a very short period of time. Rapid tape acceleration is particularly important in computer tape stations wherein a magnetic tape record must be started and stopped repeatedly on command. The magnetic tape must be moving at a constant high rate of speed before information can be recorded (written) thereon or reproduced (read) therefrom. The speed of data transfer into and out of storage in magnetic tape is therefore limited by the delay in accelerating the tape to operating speed. It is, therefore, desirable to provide tape drive systems which can accelerate the tape from start to some high operating speed in a very short period of time, and which, upon command, will permit the tape to be brought rapidly to a stop. To this end, and in an attempt to increase tape acceleration, several types of tape drive systems have been introduced.

Pneumatic tape drive systems are known which operate to alternatively apply vacuum and pressurized air to the tape so as to draw the tape into driving engagement with a rotating capstan or to blow the tape away from the capstan. Vacuum is applied when the tape is to be accelerated and pressurized air is applied when the tape is to be stopped. The disadvantages inherent in such known systems are (1) mechanical complexity, and (2) slow speed of operation, which precludes tape accelerations which are as rapid as would be desired. Slow operating speeds may be due to the time delay in the transition from the vacuum stage to the pressurized air stage. The delay inherent in this transition may be due to the inertia of the air which must be moved to replace the vacuum with pressurized air and vice-versa.

It is an object of the present invention to provide an improved pneumatic tape drive means capable of accelerating tape from rest to operating speed in a very short period of time and wherein delays due to inertia of air are substantially eliminated.

It is a further object of the invention to provide an improved pneumatic tayge drive system which is less complicated than many known pneumatic tape drive systems.

It is a still further object of the present invention to provide an improved system for driving magnetic tape past a magnetic transducing head wherein no contact may be made with the recording surface of the tape except at the head.

It is a still further object of the present invention to provide an improved magnetic tape drive system wherein the tape may be accelerated from rest to a high, constant operating speed within a very small period of time.

In accordance with the invention, use is made of the Venturi effect in a manner to control the movement of a tape. Air flow in a Venturi passage is controlled to alternatively provide negative (sub-atmospheric) or positive (above-atmospheric) air pressure which, in turn, controls the movement of the tape. The air is continuously in motion in the Venturi passage. Thus, delays due to the inertia of the air in the transition between vacuum and pressure stages of operation are substantially eliminated.

The invention may be embodied in a pneumatic tape drive system which includes a pair of counter-rotatable capstans arranged to drive a tape in opposite directions past a transducing device, such as a magnetic head. A pair of shoe members is provided, each of the shoe members being individually cooperative with a different one of the capstans. The shoe members are spaced from the capstans to provide a gap for the passage of the tape therebetween. Each shoe member is formed with a Venturi passage therein. The shoe members are apertured to provide communication between the throat of the Venturi passage and the gap between the capstan and the shoe member.

In operation, pressurized air is made to flow through the Venturi passage so as to create a suction at the apertures and draw the tape toward the shoe member and out of driving relationship with the capstan. Valve means may be provided for blocking the flow of air through the Venturi passage so that the air will flow out of the apertures and against the tape. The pressurized air will force the tape against the capstan and into driving relationship therewith, so that the capstan may drive the tape. To select tape drive in opposite directions, the valve means may be operated selectively so that the valve means in one of the shoe members is open. Accordingly, the capstan associated with the shoe member having its valve means closed will drive the tape, whereas the capstan associated with the shoe member having its valve means open will be spaced from the tape. Each of the capstans and its associated shoe member is adapted to be used individually in any tape driving system.

The invention itself, both as to its organization and method of operation, as well as additional objects and advantages thereof, will become more readily apparent from a reading of the following description in connection with the accompanying drawings, in which.

Figure 1:
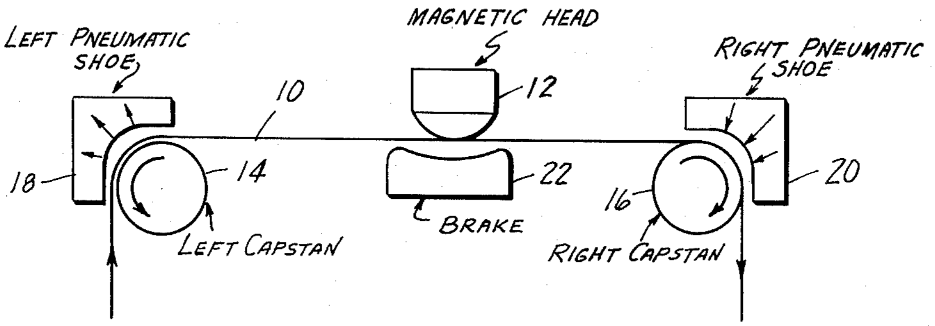
FIGURE 1 is a schematic diagram of a pneumatic tape drive system in accordance with the present invention.

Referring more particularly to FIG. 1 of the drawings, there is shown a magnetic tape 10 being driven from left to right past a magnetic transducing head 12. The tape 10 is a plastic film coated with a retentive magnetic material. The coating is on the side of the tape which contacts the magnetic head 12. The magnetic head may be a multi-channel head of the type now generally in use in computer tape stations. A left capstan 14 is provided for driving the tape 10 from right to left, as viewed in FIG. 1, and a right capstan 16 is provided for driving the tape from left to right, also as viewed in FIG. 1. The capstans are rotated by drive motors (not shown) in a clockwise direction for the right capstan 16 and in a counter-clockwise direction for the left capstan 14. Since the capstans 14 and 16 are counter-rotating, the direction of tape travel depends upon which capstan is in frictional driving relationship with the tape.

A pair of pneumatic shoe members 18 and 20 control the movement of the tape 10 into and out of frictional driving relationship with the capstans 14 and 16. The right pneumatic shoe member 20 is cooperative with the right capstan 16 and has an outer surface spaced from the drive surface of the right capstan to provide a gap through which the tape 10 passes. The left pneumatic shoe member 18 is cooperative with the left capstan 14 and has an outer surface spaced from the drive surface of the left capstan 14 also to provide a gap through which the tape passes. Arrows drawn at the outer surfaces of the shoe members 18 and 20 show the direction of air pressure developed by the shoe members when the tape 10 is being driven from left to right, as viewed in FIG. 1. The right pneumatic shoe member 20 provides a flow of pressurized air which forces the tape into driving relationship with the right capstan 16. The left pneumatic shoe member 18 develops suction which draws the tape out of driving relationship with the left capstan 14 and permits the tape to be driven by the right capstan 16 from left to right without interference from the left capstan 14.

Thec onstruction of the shoe members 18 and 20 will be described in detail hereinafter in connection with FIGS. 2 and 3 of the drawings. Briefly, these shoe members 18 and 20 have Venturi passages therein for the flow of pressurized air. The outer surfaces of the shoe members are apertured. Either suction or a flow of pressurized air may be selectively provided at the apertures. On command, the flow of air through Venturi passages of either of the shoe members may be diverted through the apertures and directed against the tape so as to force the tape into driving relationship with their associated capstans. Since air is continuously in motion through the Venturi passage, the time delay due to the inertia of the air in the transition from the vacuum (suction) stage to the pressurized air stage is substantially eliminated. In other words, a mass of air need not be exhausted from, or forced into a confined space to obtain a negative (sub-atmospheric) pressure or positive (above-atmospheric) pressure in pneumatic tape drive devices in accordance with the invention. It follows, therefore, that the time delays due to the inertia of masses of air will be substantially eliminated.

A primary limitation on tape accelerations which are obtainable with known pneumatic tape drive devices is the delay due to air inertia. Such delay is substantially eliminated in a pneumatic tape drive device in accordance with the present invention, the invention making possible extremely rapid tape accelerations from rest to high operating speed (for example, 250 inches per second) in a very short (a few milli-seconds) period of time.

In order to eliminate other limitations on tape acceleration, such as are due to the inertia of the reels on which tape is wound, a pair of bins for accumulating a predetermined amount of tape may be provided. These bins and their associated reel control devices are described in Patent No. 2,730,309, issued to J. S. Baer on January 10, 1956, and Patent No. 2,838,250, issued to Stavrakis and Kennedy on June 10, 1958. The bins, as will be noted in the Stavrakis and Kennedy patent and in the Baer patent, are placed between the reels and the capstans so that the tape may be drawn out of one bin for acceleration by one of the capstans and fed from the other capstan into the other bin. In this manner, only the weight of the tape between the bins must be accelerated.

The amount of vacuum pressure or air pressure which is developed by the shoe members 18 and 20 will depend upon the size of the Venturi passages, the pressure of the air supplied to the Venturi passages, and the velocity of the air as it flows through the Venturi passages. In accordance with a preferred form of the invention, the air pressure against the tape will be sufficient to force it into intimate driving contact with the capstan. The vacuum pressure, however, will be sufficient to draw the tape away from the capstan to a stable position adjacent to, but spaced from, the shoe member outer surface. It will be observed that the coating on the tape faces the outer surfaces of the shoe members. It is desirable that this coating not come in contact with the outer surface of the shoe members so as to prevent abrading the coating which might damage or shorten the life of the tape. Accordingly, when the tape 10 is driven, it will be in intimate frictional engagement with one of the capstans and spaced between the other capstan and its cooperative, pneumatic shoe member. This is the situation depicted in FIG. 1 of the drawings, where the tape is in frictional driving relationship with the right capstan 16 and spaced from each of the left capstan 14 and the left pneumatic shoe member 18.

It may be desirable, however, to utilize the pneumatic shoe members to effect braking of the tape whereby to stop the tape rapidly on command. In this instance, the vacuum pressure established by pneumatic shoe members 18 and 20 will be apportioned to draw the tape 10 into frictional braking engagement with the pneumatic shoe members 18 and 20. The air will be made to flow through the Venturi passages of each of the shoe members 18 and 20 so as to establish sufficient vacuum pressure at the outer surfaces of both shoe members 18 and 20 to draw the tape 10 into frictional engagement with the shoe members at their outer surfaces. The tape will thereby be brought to a stop very rapidly. In its preferred form, however, a system in accordance with the invention includes a brake 22 which is disposed on the side of the tape 10 opposite from the magnetic head 12. This brake may be similar in its construction to the brake described in another patent of Stavrakis and Kennedy, Patent No. 2,864,621, issued December 16, 1958. The brake described in the last-mentioned Stavrakis and Kennedy patent is a pressure pad operative to bias the tape 10 into intimate contact with the head during normal transducing operations. Additional force is applied to the pad to brake the tape. Alternatively, the brake 22 may be a pneumatic device having a plurality of orifices in its tape engaging surfaces. Some of these orifices may be selectively communicable with a source of vacuum which, when applied, will draw the tape away from the head 12 into frictional engagement with the brake 22. Positive air pressure may be supplied through the other orifices so as to lightly press the tape against the head into sufficiently intimate contact for satisfactory magnetic coupling between the tape and the head.

Figure 2:
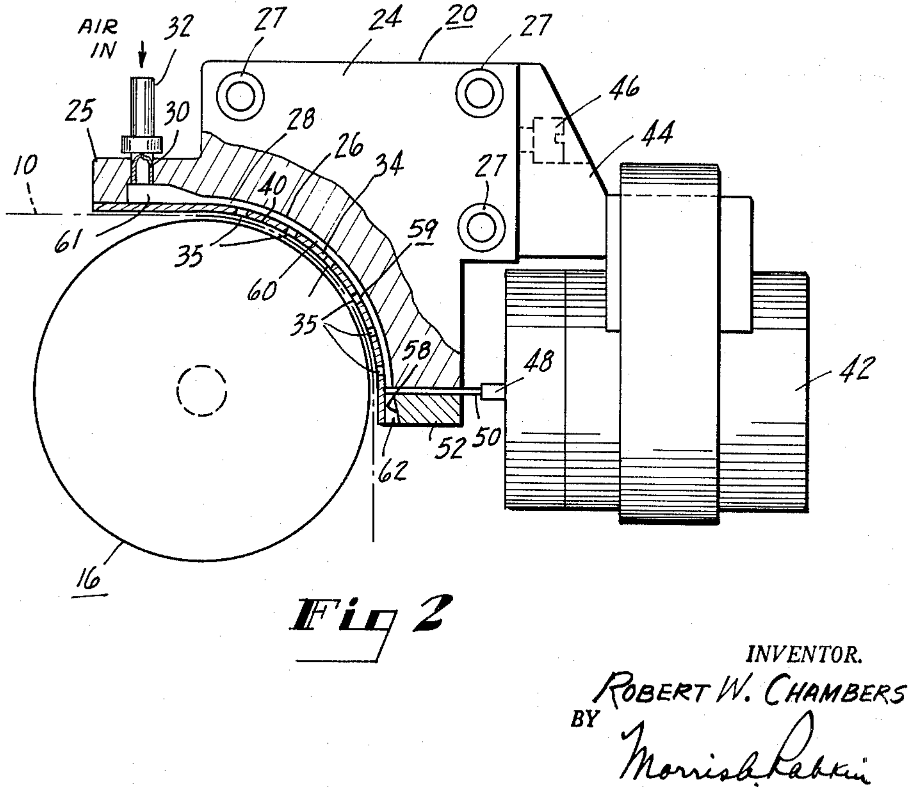
FIGURE 2 is a front view, partially in section, of one embodiment of a pneumatic tape drive device in accordance with the present invention.
Figure 3:
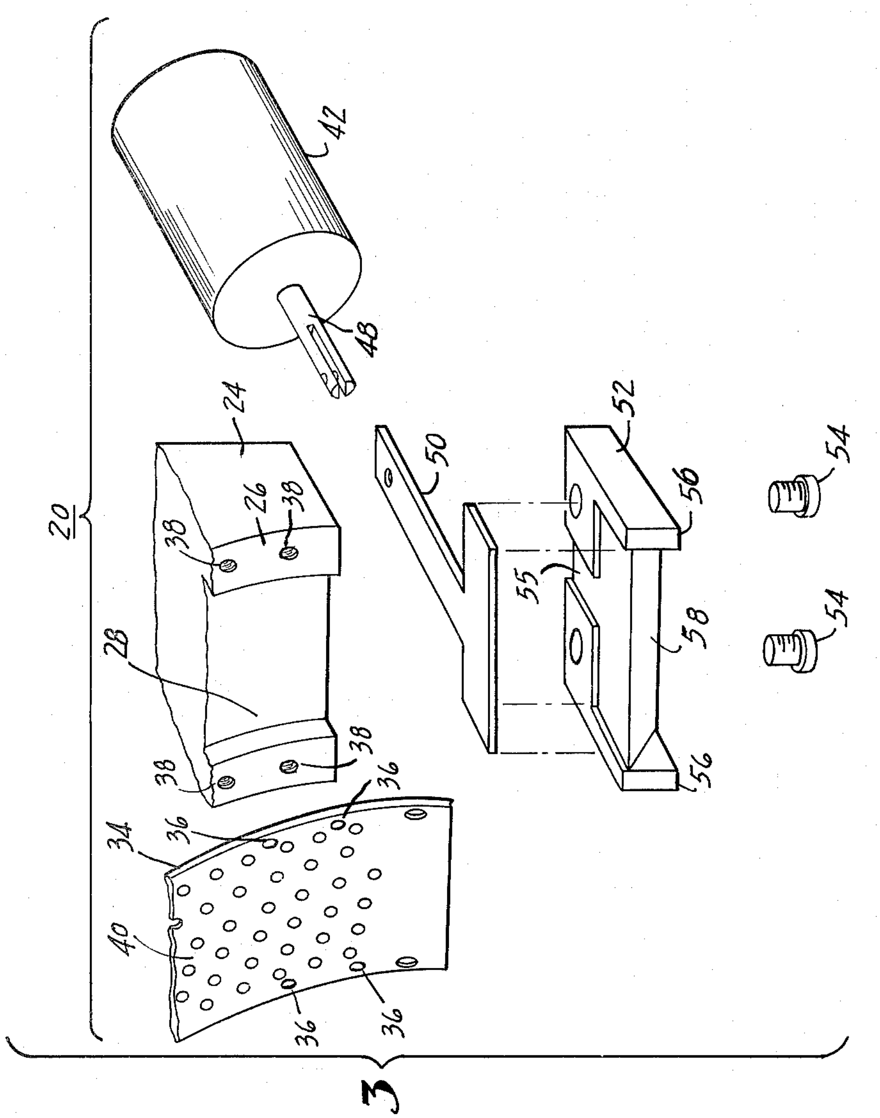
FIGURE 3 is an exploded view showing portions of the pneumatic tape driving device shown in FIG. 2.

Referring, now, to FIGS. 2 and 3 of the drawings, there is shown a pneumatic shoe member constructed in accordance with a preferred embodiment of the invention. This shoe member is suitable for use as the right pneumatic shoe member 20 which is cooperative with the right capstan 16 and will therefore be designated by like reference numerals in FIGS. 2 and 3. The shoe member 20 includes a body 24 which may be secured to the panel of a tape station by means of screws (not shown) which extend through three body mounting openings 27 and through the panel. The body member 24 has a concave, cylindrical outer surface 26 which encompasses an arc of about ninety degrees around the capstan 16. The body member 24 has a lip 25 which extends generally tangentially with respect to the capstan 16. The outer surface 26 of the body member 24 extends to the end of the lip 25. A groove 28 is formed in the outer surface 26 of the body member 24. The groove 28 is tapered in the lip 25. The groove 28 is of constant cross-sectional area except in the lip 25 where the groove widens. The lip 25 has an opening 30 therein which communicates with the groove 28. An air inlet fitting 32 is secured in this opening 30. A pipe (not shown) may be fastened at one end to this fitting 32 and, at the opposite end, to a source of pressurized air, such as a compressor.

A plate 34, which is perforated by a plurality of apertures 35, is secured to the body member 24 at the sides of its outer surface 26 by means of screws (not shown)

which are inserted through holes 36 along the side edges of the plate 34. These holes 36 are in alignment with corresponding threaded holes 38 in the body 24. This plate 34 has an outer surface 40 which parallels the outer surface of the capstan 16 through an arc of about ninety degrees around the peripheral surface of the capstan 16. The outer surface 40 of the plate 34 is spaced from the outer surface of the capstan by a distance which is desirably uniform throughout this ninety degree arc around the capstan peripheral surface. The peripheral surface of the capstan 16 and the outer surface 40 of the plate 34 define a gap therebetween for the passage of the tape. This gap may, for example, be approximately 0.01 inch in thickness. The ends of the outer surface 40 of the plate 34 also extend in a direction which is substantially tangential with respect to the peripheral surface of the capstan 16.

A solenoid 42 is mounted on a bracket 44 which is secured by means of screws 46 to the body member 24. The armature 48 of this solenoid 42 carries a valve plate 50. The valve plate 50 is a T-shaped plate which is supported in a valve seat 52. The valve seat 52 is secured by means of screws 54 to the underside of the body member 24. The valve seat 52 has a T-shaped slot 55 therein in which the valve plate 50 can slide.

The seat 52 has a pair of end members 56 which are in alignment with the outer surface 26 of the body member 24. The seat 52 has a tapered groove 58 therein between the end members 56.

The plate 34, the grooved, outer surface 26 of the body member 24, and the grooved surface 56 of the valve seat 52 form a Venturi passage 59 (FIG. 2) which has a relatively long throat 60 of arcuate configuration generally paralleling the surface of the capstan 16. The passage 59 also has an entrance 61 which tapers outwardly from the throat 60 because of the shape of the groove 28 in the lip 25 in the body member 24. The passage terminates in an exit 62 in the valve seat 52 which tapers outwardly from the throat 60 because of the shape of the groove 58 in the valve seat 52. The Venturi passage 59 has the classical Venturi area relationships. Pressurized air can flow into the entrance through the inlet fitting 32 and out of the passage 59 through either the exit 62 or the apertures 35 depending upon the position of the valve plate 50.

The Venturi passage 59 desirably has the dimensional characteristics which produce critical pressure in the throat 60. Critical pressure in the Venturi passage 59 is that pressure above which little additional flow through the throat 60 will be produced notwithstanding increases in the air pressure applied at the entrance 61. By operating with input pressure above critical pressure, the variations in air pressure produced by the source of pressurized air (e.g., a compressor) will not affect the flow of air through the throat 60 of the Venturi passage and therefore will not altar the suction created at the apertures 35 by the flow of air through the Venturi passage. Accordingly, it is desirable that the ratio of the area of the Venturi passage 59 across the entrance portion 61 to the area across the throat portion 60 dictate a critical pressure below that of the pressure produced by the source of pressurized air. In a typical embodiment of the invention, with an input air pressure of about 44 p.s.i. the ratio of the cross-sectional areas of the entrance portion 61 to the throat portion 60 of the Venturi passage 59 is desirably about 1.9.

A turbulence free flow of air out of the Venturi passage 59 is provided due to the shape of the exit portion 62. Since the largest cross-sectional area across the exit portion 62 is greater than the cross-sectional area across the throat portion 60 of the Venturi passage 59, the pressure of the escaping air will be less than atmospheric pressure but greater than the pressure in the throat portion of the Venturi passage. The ratio of the largest area across the exit portion to the area across the throat portion is desirably the same as the ratio of the area across the entrance portion to the area across the throat portion. The tendency for the air to back up into the throat of the Venturi passage from the exit portion is reduced, since the transition between atmospheric pressure and sub-atmospheric pressure in the Venturi passage is a gradual one because of the outwardly tapered exit portion 62 in the valve seat 52.

In operation, the solenoid 42 may be electrically energized in response to command signals. The solenoid is then actuated electrically and moves the valve plate 50 either to the position shown in FIG. 2 of the drawings in which the exit 62 of the Venturi passage 59 is blocked, or to a position in which the exit 62 of this passage 59 is unblocked. These two positons of the valve plate 50 may be set by stops which are built into the solenoid 52 in accordance with conventional solenoid design techniques. With the valve plate 50 in exit blocking position, as shown in FIG. 2, the condition of operation of the right pneumatic shoe 20 illustrated in FIG. 1 of the drawing is obtained. Air flowing through the Venturi passage 59 flows out of the apertures 35. A positive air pressure is then exerted against the tape 10 which forces the tape 10 into driving engagement with the capstan 16. The capstan 16 then can accelerate the tape and drive it from left to right as viewed in FIG. 2.

When the solenoid 42 is actuated by command signals which cause the armature 48 thereof to be withdrawn into the body of the solenoid 42, the valve plate 50 unblocks the Venturi passage 59 and the flow of pressurized air can continue unimpeded through the passage 59 and out of the exit 62 thereof. The pressure in the throat of the Venturi passageway which is co-extensive with a ninety degree arc around the capstan 16, as explained heretofore, becomes reduced to sub-atmospheric pressure. Accordingly, suction is created at the apertures 35 which draws the tape towards the plate 34 and away from the capstan 16. The tape does not touch the plate 34 as was mentioned above. The force upon the tape is sufficient to bring the tape out of driving relation with the capstan. Accordingly, the capstan 16 is no longer effective to drive the tape.

By suitable circuitry for energizing the solenoid associated with the left pneumatic shoe 18 (FIG. 1) and the right pneumatic shoe 20, the valve plate 50 can be made to assume a position blocking the Venturi passage in the right pneumatic shoes member 20 and the corresponding valve plate in the left pneumatic shoe member 18 can be actuated to assume a position unblocking the Venturi passage through the left pneumatic shoe member. Accordingly, the tape 10 will be driven from left to right by the right capstan 16, as shown in FIG. 1 of the drawings. Alternatively, the valve plate in the left pneumatic shoe member 18 can be actuated to block the Venturi passage in the left pneumatic shoe member while the valve plate 50 in the right pneumatic shoe member 20 unblocks the Venturi passage through the right pneumatic shoe member. In the latter case, the tape will be driven from right to left by the left capstan 14. Thus, tape drive in opposite directions across the magnetic head may be obtained upon application of appropriate command signals to the solenoids associated with the right and left pneumatic shoe members 20 and 18, respectively.

From the foregoing description, it will be apparent that there has been provided an improved pneumatic tape drive system by means of which faster tape accelerations can be obtained than was the case with pneumatic drive systems of the prior art. Pneumatic devices in accordance with the invention are also less complex than known pneumatic tape drive devices and therefore can be manufactured at lower cost than was the case with known tape drive devices of the pneumatic type. While the invention is described above as applied to a magnetic tape drive system, features of the invention may be incorporated in other systems for driving and controlling the movement of tape, films and other objects. Accordingly, the foregoing should be taken as illustrative and not in any limiting sense.

What is claimed is:

1. Apparatus for controlling the movement of a tape along a path which comprises a member having a tape engaging surface disposed along and adjacent to said path, said member also having a Venturi passage for the flow of air therethrough, said passage having an entrance, a throat and an exit, said throat generally paralleling said path and being of smaller maximum cross-sectional area than said entrance, means for feeding said tape along said path, said member having an aperture extending between said surface and said throat which provides communication between said throat and said path, and valve means disposed at said exit for controlling the flow of air through said passage thereby selectively establishing suction at said surface for bringing said tape into engagement with said surface.

2. Apparatus cooperative with a tape drive member having a tape drive surface for selectively engaging a tape with and disengaging the tape from said drive member surface, which apparatus comprises a shoe having an outer surface facing said drive member surface and defining with said drive member surface a gap for the passage of the tape therebetween, said outer surface having perforations therein, said shoe having a Venturi passage for the flow of pressurized air, said perforations providing communication between said Venturi passage and said outer surface and means for selectively opening and closing said Venturi passage where said air leaves said passage for respectively providing positive and negative air pressure to bring said tape in said gap into and out of engagement with said tape drive surface.

3. Apparatus cooperative with a tape drive member for driving a tape, said tape drive member having a tape engaging surface, which apparatus comprises a shoe member having an outer surface spaced from said tape engaging surface to define a gap therebetween for reception of the tape, said shoe member having a Venturi passage therein for the flow of pressurized air between opposite ends of said passage for developing air pressure below atmospheric pressure in part of said passage, said shoe member being apertured through said shoe member outer surface to provide communication between said passage part and said gap, and valve means disposed adjacent the end of said passage out of which said pressurized air flows for selectively blocking and unblocking the flow of air between said opposite ends of said passage for respectively providing air pressure above and below atmospheric pressure so as to bring the tape in said gap into and out of engagement with said tape engaging surface.

4. Apparatus cooperative with a tape drive capstan which has a cylindrical peripheral surface and which is rotatable for driving a tape in engagement with said peripheral surface which comprises a shoe member having an outer surface arcuate in part and generally paralleling said capstan peripheral surface and in part extending generally tangentially from said capstan peripheral surface, said arcuate part of said shoe member outer surface being closely adjacent to but spaced from said capstan peripheral surface to define a gap therebetween for reception of the tape, said shoe member having a Venturi passage generally paralleling said shoe member outer surface, said passage having an entrance portion which tapers inwardly into a throat portion, and an exit portion which extends outwardly from said throat portion into the atmosphere, said shoe member having a plurality of apertures between said throat portion of said passage and said arcuate part of said outer surface, air pressure supply means for supplying pressurized air into said entrance portion, and a valve plate movable across said passage at said exit portion for selectively blocking and unblocking the flow of said pressurized air outwardly of said passage through said exit portion.

5. The invention as set forth in claim 4 wherein the ratio of the cross-sectional areas of said entrance portion and said throat portion in a direction perpendicular to the direction of flow of said pressurized air is such that the said pressurized air is at a pressure above critical pressure for said Venturi passage.

6. The invention as set forth in claim 4 wherein said exit portion tapers outwardly from said throat portion.

7. In a tape transport system having a pair of counter rotatable capstans disposed on opposite sides of a tape record transducing device and separately operative to drive a tape record in opposite directions past said transducing device, the improvement which comprises first and second shoe members respectively cooperative with different ones of said capstans and having outer surfaces spaced from said capstans to provide gaps for the passage of the tape therethrough, each of said shoe members having a Venturi passage therethrough for pressurized air, said shoe members having apertures extending through their outer surfaces providing communication between said gaps and said Venturi passages, and valve means individual to said shoe members for alternatively closing said Venturi passage in said first shoe member and opening said Venturi passage in said second shoe member whereby to direct pressurized air through said first shoe member apertures to force the tape into driving engagement with the one of said pair of capstans cooperative therewith and to create suction at said second shoe member apertures to draw the tape out of driving engagement with the other of said pair of capstans and vice-versa.

8. Apparatus for controlling the movement of a tape along a path, which apparatus comprises (a) a first member having a tape engaging surface disposed along said path, (b) a second member disposed along said path and adjacent to said first member, (c) said second member having a passage therethrough adapted to be opened and closed and shaped to provide, in accordance with the Venturi effect, over part of said passage, air pressure below atmospheric pressure when said passage is opened and air pressure above atmospheric pressure when said passage is closed, (d) said member having an aperture which provides communication between said passage part and that portion of said path along which said first member tape engaging surface is disposed, and (e) means for opening and closing said passage for selectively establishing air pressure below and above atmospheric pressure at said aperture for selectively forcing said tape out of and into engagement with said tape engaging surface.

9. Apparatus for controlling the movement of tape along a path, which apparatus comprises (a) a member having a tape engaging surface disposed along and adjacent to said path, (b) means for feeding said tape along said path, (c) said member having a passage therethrough adapted to be opened and closed and shaped to provide, in accordance with the Venturi effect, over part of said passage, air pressure below atmospheric pressure when said passage is opened and air pressure above atmospheric pressure when said passage is closed, (d) said member having an aperture extending through said surface providing communication between said passage part and that portion of said path along which said tape engaging surface is disposed, and (e) means for opening and closing said passage for selectively establishing air pressure below and above atmospheric pressure at said aperture and bringing said tape out of and into engagement with said tape engaging surface.

10. Apparatus for controlling the movement of a tape along a path which comprises a first member having a tape engaging surface spaced along and adjacent to said path, a second member having a Venturi passage for the flow of air therethrough, said passage having an entrance, a throat and an exit, said throat being of smaller maximum cross-sectional area than said entrance, said second member having a surface opposing said first member surface, said second member also having an aperture extending between its said surface and said throat, which aperture provides communication between said throat and said path where said path communicates with said aperture, and valve means disposed at said exit for controlling the flow of air through said passage and selectively establishing suction for bringing said tape out of engagement with said tape engaging surface and positive air pressure for bringing said tape into engagement with said tape engaging surface.

11. A tape transport apparatus including driving means and means for controlling the transport of said tape by said drive means along a tape path including:

(a) a member having a tape engaging surface disposed adjacent to said path, (b) said member having a passage therethrough adapted to be opened and closed and shaped to provide, in accordance with the Venturi effect, over part of said passage, air pressure below atmospheric pressure when said passage is opened and air pressure above atmospheric pressure when said passage is closed, (c) said member having an aperture extending through said surface providing communication between said passage part and that portion of said path along which said tape engaging surface is disposed, and (d) means for opening and closing said passage for selectively establishing air pressure below and above atmospheric pressure at said aperture and bringing said tape out of and into engagement with said tape engaging surface.

References Cited by the Examiner

UNITED STATES PATENTS

| | | | |
|---|---|---|---|
| 2,581,450 | 1/1952 | Seeler | 137—64 X |
| 2,852,253 | 9/1958 | Pouliart et al. | 226—95 |
| 2,954,911 | 10/1960 | Baumeister et al. | 226—95 |

FOREIGN PATENTS

| | | |
|---|---|---|
| 677,882 | 7/1939 | Germany. |

ROBERT B. REEVES, *Primary Examiner.*

HARRISON R. MOSELEY, JOSEPH P. STRIZAK, ABRAHAM BERLIN, *Examiners.*